United States Patent
Basso et al.

(10) Patent No.: US 7,280,527 B2
(45) Date of Patent: Oct. 9, 2007

(54) LOGICALLY GROUPING PHYSICAL PORTS INTO LOGICAL INTERFACES TO EXPAND BANDWIDTH

(75) Inventors: Claude Basso, Raleigh, NC (US); Francis Arts, Arendonk (BE); Bay Van Nguyen, Cary, NC (US); Natarajan Vaidhyanathan, Greensboro, NC (US); Colin Beaton Verrilli, Apex, NC (US)

(73) Assignees: International Business Machines Corporation, Armonk, NY (US); Alcatel, Paris (FR)

( * ) Notice: Subject to any disclaimer, the term of this patent is extended or adjusted under 35 U.S.C. 154(b) by 1077 days.

(21) Appl. No.: 10/144,075

(22) Filed: May 13, 2002

(65) Prior Publication Data

US 2003/0210688 A1 Nov. 13, 2003

(51) Int. Cl.
*H04L 12/28* (2006.01)
(52) U.S. Cl. ............... 370/351; 370/352; 370/389
(58) Field of Classification Search ............... None
See application file for complete search history.

(56) References Cited

U.S. PATENT DOCUMENTS

| | | | | |
|---|---|---|---|---|
| 5,400,324 | A | | 3/1995 | Eriksson et al. ............ 370/60 |
| 5,551,027 | A | * | 8/1996 | Choy et al. ............ 707/201 |
| 5,802,047 | A | | 9/1998 | Kinoshita ............ 370/359 |
| 6,072,797 | A | | 6/2000 | Fletcher ............ 370/394 |
| 6,104,696 | A | | 8/2000 | Kadambi et al. ............ 370/218 |
| 6,108,702 | A | | 8/2000 | Wood ............ 709/224 |
| 6,167,052 | A | | 12/2000 | McNeill et al. ............ 370/399 |
| 6,192,051 | B1 | * | 2/2001 | Lipman et al. ............ 370/389 |
| 6,463,067 | B1 | * | 10/2002 | Hebb et al. ............ 370/413 |
| 6,516,345 | B1 | * | 2/2003 | Kracht ............ 709/220 |
| 6,553,005 | B1 | * | 4/2003 | Skirmont et al. ............ 370/285 |
| 6,658,002 | B1 | * | 12/2003 | Ross et al. ............ 370/392 |
| 6,697,475 | B1 | * | 2/2004 | MeLampy et al. ............ 379/201.12 |

(Continued)

FOREIGN PATENT DOCUMENTS

EP 0923211 A2 6/1999

(Continued)

OTHER PUBLICATIONS

"Auto-port Aggregation and Lan Monitor," via Internet at wysiwyg://5/http://techsolutions.hp.com/dir_apa/details.html, pp. 1-2.

(Continued)

*Primary Examiner*—Phirin Sam
(74) *Attorney, Agent, or Firm*—Robert A. Voigt, Jr.; Winstead PC (57) ABSTRACT

A method, system and computer program product for routing packets. A network device, e.g., router, may comprise a switch fabric coupled to a plurality of blades where each blade may comprise one or more network processors coupled to one or more physical ports. The physical ports may be connected to another one or more network devices. A plurality of physical ports across one or more blades connected to the same network device may be logically mapped into a logical interface to that network device. By logically grouping a plurality of physical ports into a logical interface to a network device, a network processor may be able to transmit packets of data to that network device across multiple ports instead of one physical port.

20 Claims, 5 Drawing Sheets

U.S. PATENT DOCUMENTS

| | | |
|---|---|---|
| 6,973,508 B2 * | 12/2005 | Shepard et al. ............... 710/8 |
| 2001/0043614 A1 | 11/2001 | Viswanadham et al. |
| 2002/0093952 A1 * | 7/2002 | Gonda ...................... 370/369 |
| 2002/0114276 A1 * | 8/2002 | Basturk .................... 370/230 |
| 2003/0101426 A1 * | 5/2003 | Sarkinen et al. ............. 716/12 |
| 2003/0120798 A1 * | 6/2003 | Bouchard et al. ........... 709/236 |
| 2005/0063366 A1 * | 3/2005 | Wheeler et al. ............ 370/352 |

FOREIGN PATENT DOCUMENTS

| | | |
|---|---|---|
| EP | 1 193 918 A2 | 9/2001 |
| WO | 02/09307 | 1/2002 |

OTHER PUBLICATIONS

"BSDI Driver with Embedded RAINlink Technology," *RAINlink for BSDI User's Guide*, via Internet at http://www.zynx.com, pp. 1-13.

Norman Finn. "Automatic Trunking Establishment: Problem Statement," *IEEE*, Cisco Systems, Inc., Feb. 3, 1998, pp. 1-8.

European Search Report dated Aug. 18, 2003.

European Search Report dated May 7, 2004.

* cited by examiner

LOGICALLY GROUPING PHYSICAL PORTS INTO LOGICAL INTERFACES TO EXPAND BANDWIDTH

TECHNICAL FIELD

The present invention relates to the field of packet switching networks, and more particularly to logically grouping physical ports of a network device, e.g., router, into logical interfaces thereby expanding the bandwidth capacity of transmitting packets from that network device to another network device.

BACKGROUND INFORMATION

A packet switching network has switching points or nodes (commonly referred to as routers or switches) for transmissions of data among senders and receivers connected to the network. The switching performed by these switching points is in fact the action of passing on packets of data received by a switching point or node to a further node in the network. Such switching actions are the means by which communication data is moved through the packet switching network.

Each router may comprise a switch fabric coupled to a plurality of blades. The switch fabric may be configured to direct the incoming packets of data to particular blades coupled to the switch fabric. Each blade may comprise a processor commonly referred to as a network processor coupled to one or more ports. Each port may be physically connected to another network device, e.g., router. Upon the network processor processing a packet of data, the network processor may index into a table, commonly referred to as a forwarding table, to determine the address of which port to transmit the processed packet. The forwarding table may comprise a plurality of entries where each entry may comprise an address of a particular port. The address indexed may correspond to a particular port connected to another network device. The processed packet may then be transmitted across that port to the connected network device.

Since the processed packets may be transmitted by the network processor across one particular address, the rate at which the processed packets are transmitted is limited to the bandwidth of the connection. That is, since the processed packets may be transmitted by the network processor across one physical port to a particular network device, the rate at which the processed packets are transmitted is limited to the bandwidth of the physical connection between the port and the network device.

If, however, the packets of data were able to be transmitted across multiple physical ports to a particular network device from a particular network processor, then the bandwidth capacity would be increased. That is, if packets of data were able to be transmitted across multiple physical ports to a particular network device by a network processor, then the rate packets of data are transmitted may be increased.

It would therefore be desirable to enable a network processor to transmit packets of data across multiple physical ports to a particular network device instead of one physical port.

SUMMARY

The problems outlined above may at least in part be solved in some embodiments by mapping a plurality of physical ports connected to a network device into a logical interface to that network device, e.g., router, gateway, edge device, server. That is, a plurality of physical ports may be logically grouped into a logical interface to a network device thereby enabling a network processor to transmit packets of data across multiple ports instead of one physical port.

In one embodiment of the present invention, a method for routing packets may comprise the step of mapping a plurality of physical ports in a network device, e.g., router, connected to another network device, e.g., router, gateway, edge device, server, into a logical interface to that network device. By logically grouping a plurality of ports into a logical interface, a network processor in the network device, e.g., router, may be able to transmit packets of data across multiple physical ports to a particular network device instead of one physical port as discussed further below.

A network device, e.g., router, may comprise a switch fabric coupled to a plurality of blades where each blade may comprise one or more network processors coupled to one or more ports. These ports may be connected to another one or more network devices. The switch fabric may be configured to direct incoming packets of data to particular blades where one or more of the network processors in the recipient blade may be configured to process the received packets.

Upon a network processor receiving a packet of data, the network processor may index into a table, commonly referred to as a forwarding table, to determine the table associated with a particular logical interface as well as the next destination address. The forwarding table may comprise a plurality of entries where each entry may comprise information indicating a particular table associated with a particular logical interface as well as the next destination address. Each logical interface may be associated with a table storing a plurality of entries containing blade/port combinations as discussed further below. In one embodiment, an entry may be indexed in the forwarding table using a destination address in the received packet header.

A hash function may then be performed on the received packet to generate a hash value. In one embodiment, a hash function may be performed on the source and destination address in the packet header to generate a hash value.

The hash value generated may be used to index into the table associated with a particular logical interface. Upon indexing into the table associated with the logical interface, an appropriate blade/port combination may be identified to transmit the received packet of data. In one embodiment, a blade/port combination may be selected in the indexed entry of the table associated with the logical interface by using a portion of the bits of the hashed value. The received packet may then be transmitted through the identified blade/port combination to the next destination (next destination previously identified by the next destination address in the forwarding table).

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
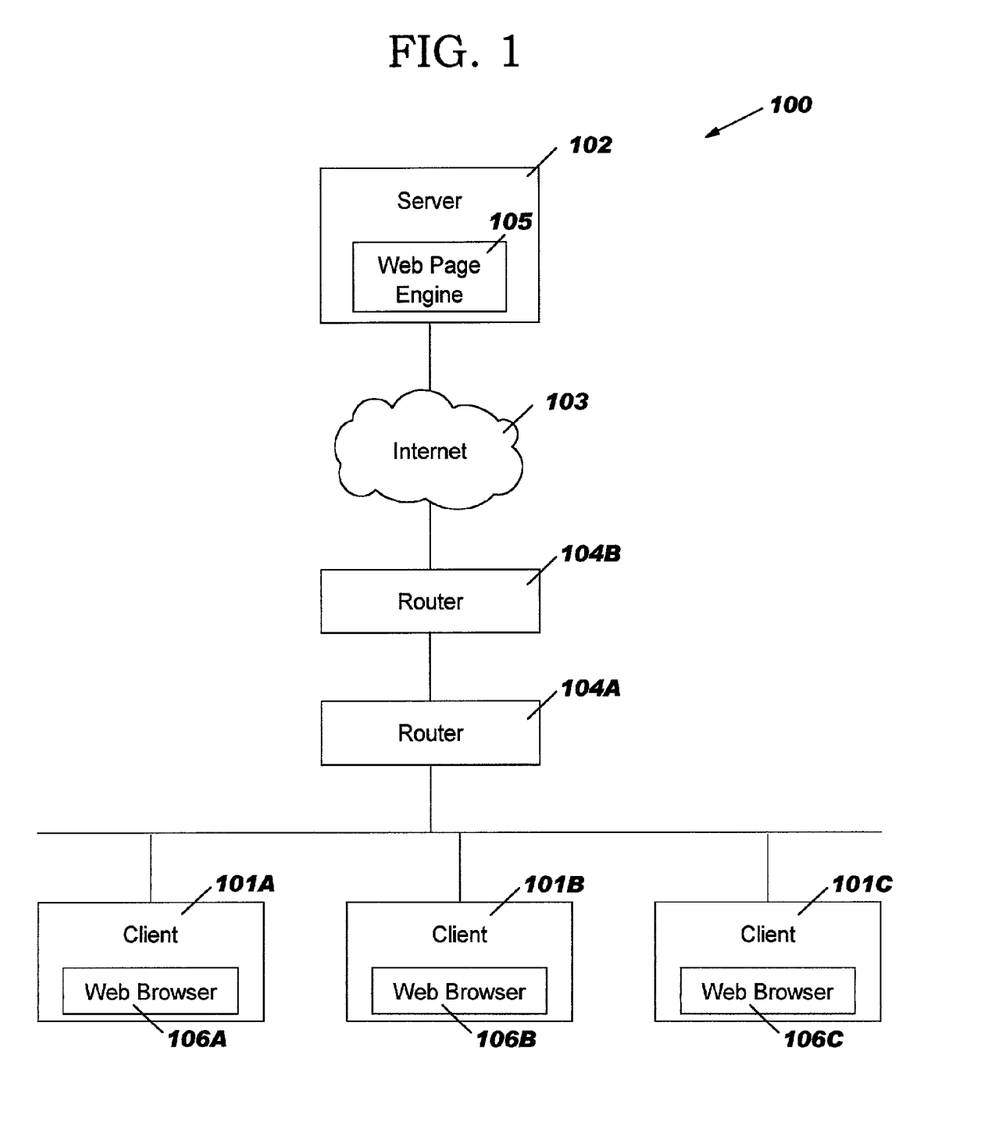
FIG. 1 illustrates a network system configured in accordance with the present invention.

FIG. 1—Network System

FIG. 1 illustrates one embodiment of the present invention of a network system 100. Network system 100 may comprise one or more clients 101A-C connected to a server 102 via the Internet 103. A more detailed description of server 102 is provided further below in conjunction with FIG. 3. The Internet 103 may refer to a network of computers. Network system 100 may further comprise one or more routers, e.g., 104A-B, that may be coupled to one or more clients 101A-C. Routers 104A-B may be configured to forward packets of information from the one or more clients 101A-C to the Internet 103. Clients 101A-C may collectively or individually be referred to as clients 101 or client 101, respectively. A more detailed description of client 101 is provided further below in conjunction with FIG. 2. Routers 104A-B may collectively or individually be referred to as routers 104 or router 104, respectively. A more detailed description of router 104 implementing logical interface(s) is provided further below in conjunction with FIG. 4. It is noted that network system 100 may comprise any number of clients 101, any number of servers 102 as well as any number of routers 104 and that FIG. 1 is illustrative. It is further noted that network system 100 may comprise one or more routers (not shown) that may be coupled to server 102. These routers (not shown) may be configured to forward received packets of information to server 102. It is further noted that the connection between clients 101 and the Internet 103 may be any medium type, e.g., wireless, wired. It is further noted that client 101 may be any type of device, e.g., wireless, Personal Digital Assistant (PDA), cell phone, personal computer system, workstation, Internet appliance, configured with the capability of connecting to the Internet 103 and consequently communicating with server 102. It is further noted that FIG. 1 is not to be limited in scope to any one particular embodiment.

Referring to FIG. 1, server 102 may comprise a web page engine 105 for maintaining and providing access to an Internet web page which is enabled to forward static web pages as well as web pages to a web browser 106 of client 101 via the Internet 103. Each client 101A-C may comprise a web browser 106A-C, respectively, which may be configured for communicating with the Internet 103 and for reading and executing web pages. Browsers 106A-C may collectively or individually be referred to as browsers 106 or browser 106, respectively. While the illustrated client engine is a web browser 106, those skilled in the art will recognize that other client engines may be used in accordance with the present invention.

Figure 2:
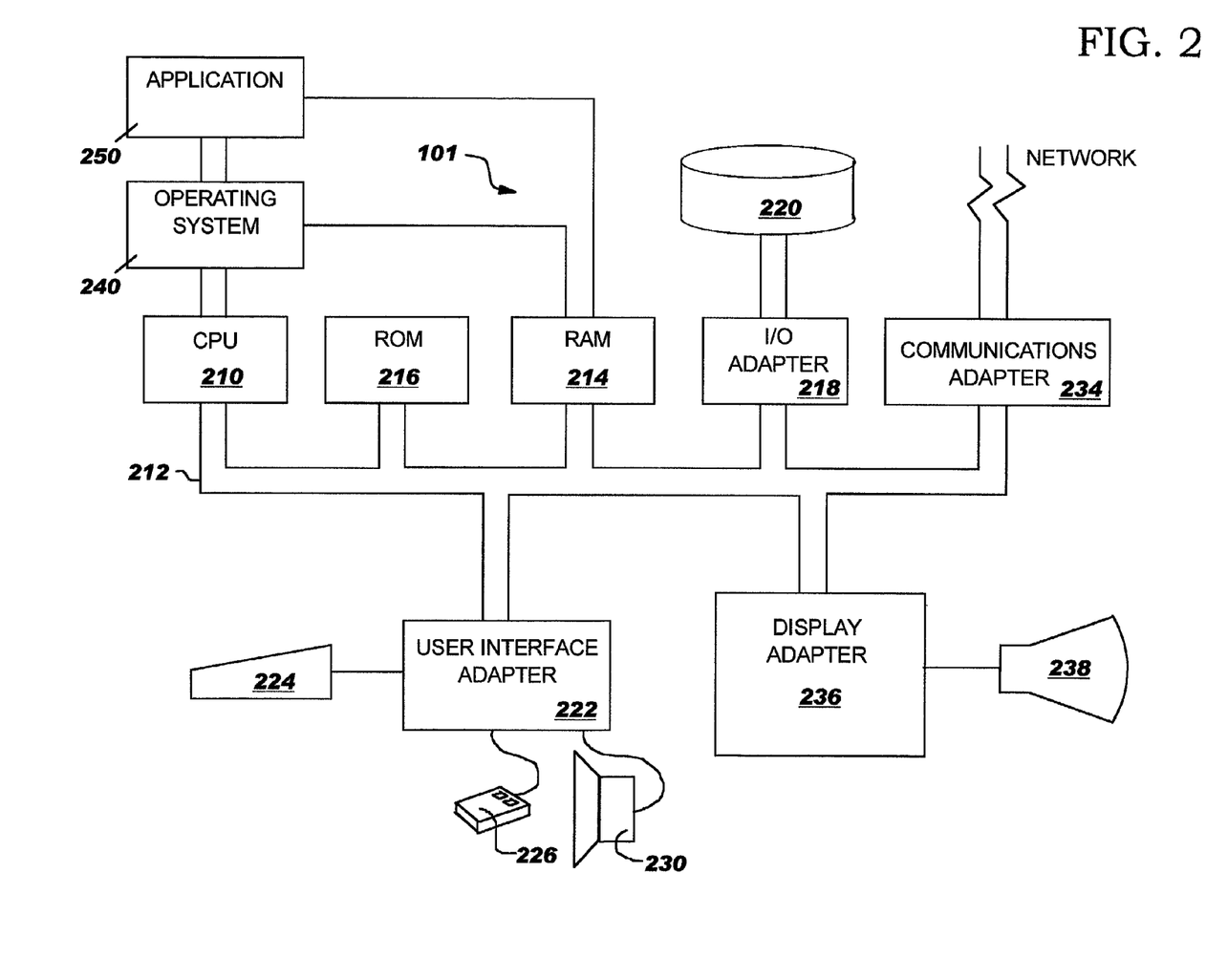
FIG. 2 illustrates an embodiment of a client in the network system configured in accordance with the present invention.

FIG. 2—Hardware Configuration of Client

FIG. 2 illustrates a typical hardware configuration of client 101 (FIG. 1) which is representative of a hardware environment for practicing the present invention. Client 101 may have a central processing unit (CPU) 210 coupled to various other components by system bus 212. An operating system 240 may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a web browser. Read-Only Memory (ROM) 216 may be coupled to system bus 212 and include a Basic Input/Output System ("BIOS") that controls certain basic functions of client 101. Random access memory (RAM) 214 and Input/Output (I/0) adapter 218 may also be coupled to system bus 212. It should be noted that software components including operating system 240 and application 250 may be loaded into RAM 214 which may be client's 101 main memory for execution. I/O adapter 218 may be a small computer system interface ("SCSI") adapter that communicates with a disk unit 220, e.g., disk drive. It is noted that the web browser may reside in disk unit 220 or in application 250.

Referring to FIG. 2, client 101 may further comprise a communications adapter 234 coupled to bus 212. Communications adapter 234 may enable client 101 to communicate with server 102 (FIG. 1), router 104 (FIG. 1). I/O devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting to client 101 through keyboard 224 or mouse 226 and receiving output from client 101 via display 238.

Figure 3:
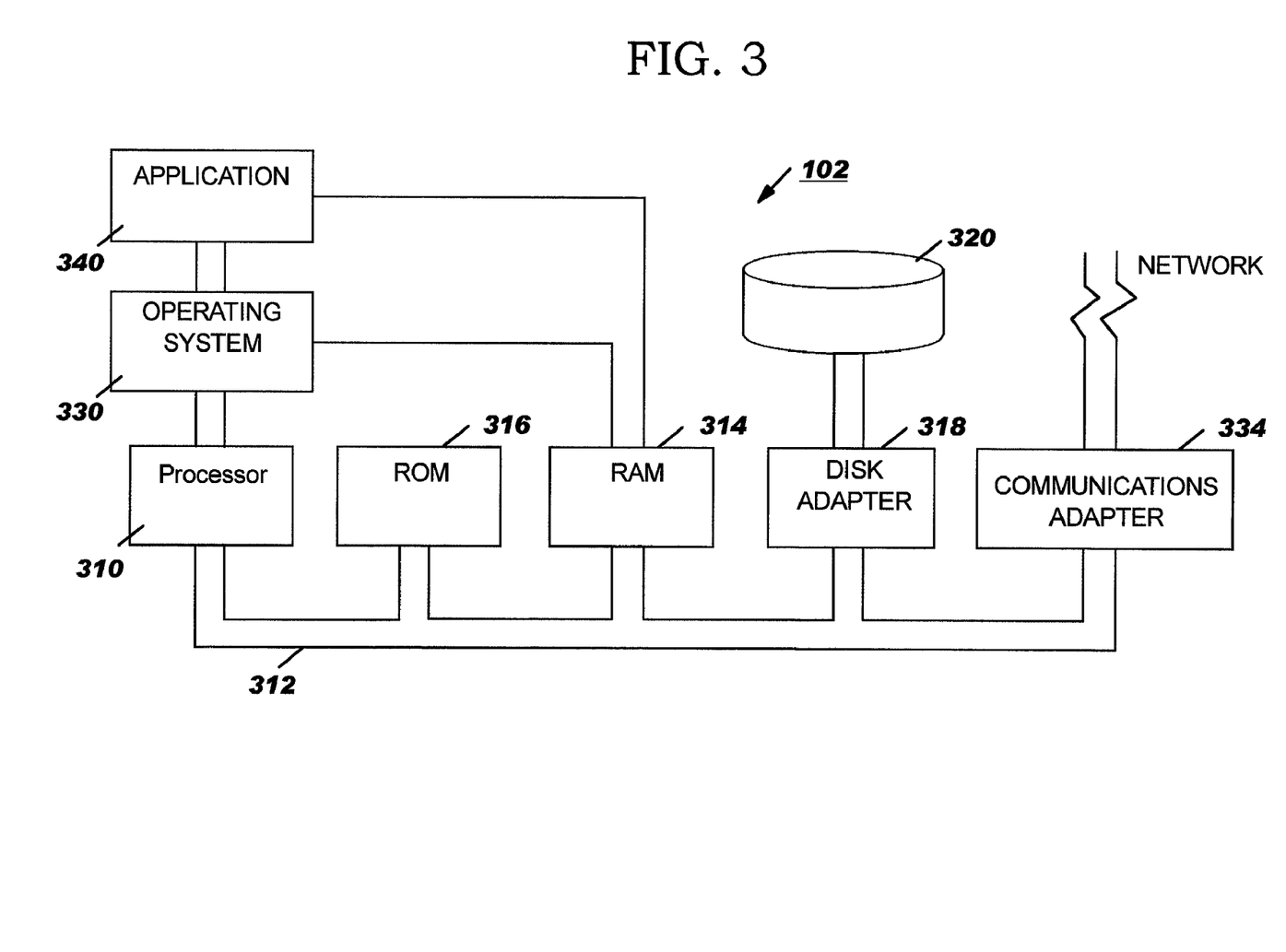
FIG. 3 illustrates an embodiment of a server in the network system configured in accordance with the present invention.

FIG. 3—Hardware Configuration of Server

FIG. 3 illustrates an embodiment of the present invention of server 102 (FIG. 1). Referring to FIG. 3, server 102 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 may include, for example, a program for operating a web site. Read-only memory (ROM) 316 may be coupled to system bus 312 and include a Basic Input/Output System ("BIOS") that controls certain basic functions of server 102. Random access memory (RAM) 314 and disk adapter 318 may also be coupled to system bus 312. It should be noted that software components including operating system 330 and application 340 may be loaded into RAM 314 which may be server's 102 main memory. Disk adapter 318 may be an adapter that communicates with disk unit 320, e.g., disk drive. Communications adapter 334 may also be coupled to system bus 312. Communications adapter 334 may interconnect bus 312 with an outside network enabling server 102 to communicate with client 101 via the Internet 103.

Figure 4:
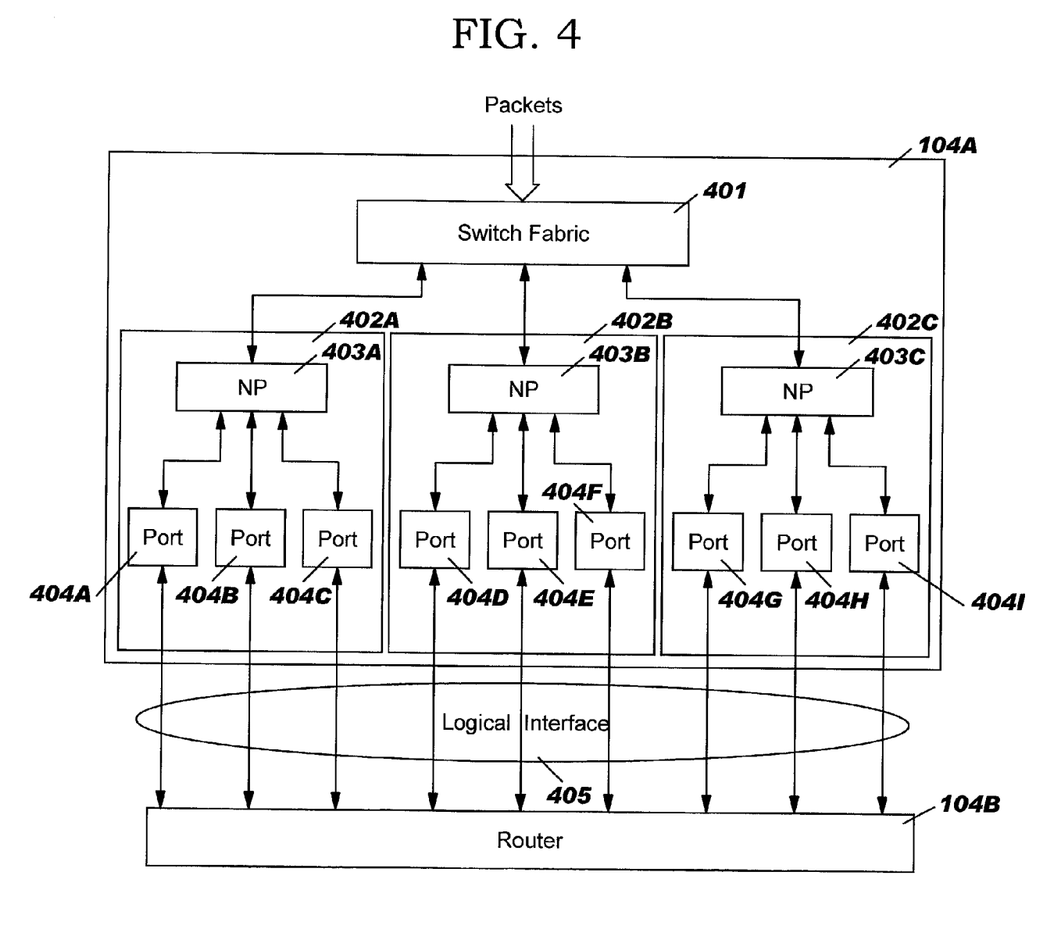
FIG. 4 illustrates an embodiment of a router with logical groupings of its physical ports in accordance with the present invention.

FIG. 4—Hardware Configuration of Router

FIG. 4 illustrates an embodiment of the present invention of router 104A (FIG. 1) implementing logical interface(s) as discussed further below. It is noted that even though the following discusses an embodiment of the present invention of router 104A that the description of router 104A applies to any router 104, e.g., router 104B, of network system 100 (FIG. 1).

Returning to FIG. 4, router 104A may be configured to receive packets of data such as from client 101 (FIG. 1), e.g., client 101A, that may be directed to another particular network device, e.g., router 104B, in network 100 (FIG. 1). Router 104A may comprise a switch fabric 401 configured to direct the incoming packets of data to particular blades 402A-C coupled to switch fabric 401. Blade 402A may comprise a network processor 403A coupled with one or more ports 404A-C. Blade 402B may comprise a network processor 403B coupled with one or more ports 404D-F. Blade 402C may comprise a network processor 403C coupled with one or more ports 404G-I. Blades 402A-C may collectively or individually be referred to as blades 402 or blade 402, respectively. Network processors 403A-C may collectively or individually be referred to as network processors 403 or network processor 403, respectively. Ports 404A-I may collectively or individually be referred to as ports 404 or port 404, respectively. Each port 404 may be coupled to a particular network device, e.g., gateway, server, router such as router 104B, in network system 100. It is noted that some of ports 404 may be coupled to a separate network device and that FIG. 4 is illustrative. It is further noted that router 104A may comprise any number of blades 402 and each blade 402 may comprise any number of network processors 403 and ports 404.

Referring to FIG. 4, network processor 403 may be configured to receive a packet of data from switch fabric 401. Upon receiving a packet, network processor 403 may be configured to process the packet of data. Processing may include but not limited to: determining what activities to be performed on the received packet, transmitting or discarding the received packet, determining which network device, e.g., router such as router 104B, server, edge device, gateway, to transmit the received packet, etc. Network processor 403 may then transmit the processed packet to a particular network device, e.g., router such as router 104B, through a port 404 connected to that network device.

As stated in the Background Information section, each port may be physically coupled to another network device, e.g., router. Since the processed packets may be transmitted by a network processor across one particular address, the rate at which the processed packets are transmitted is limited to the bandwidth of the connection. That is, since the processed packets may be transmitted by the network processor across one physical port to a particular network device, the rate at which the processed packets are transmitted is limited to the bandwidth of the physical connection between the port and the network device.

If, however, packets of data were able to be transmitted across multiple physical ports to a particular network device from a particular network processor, then the bandwidth capacity would be increased. That is, if packets of data were able to be transmitted across multiple physical ports to a particular network device by a network processor, then the rate packets of data are transmitted may be increased. It would therefore be desirable to enable a network processor to transmit packets of data across multiple physical ports to a particular network device instead of one physical port.

Network processor 403 may be configured to transmit packets of data across multiple physical ports 404 to a particular network device, e.g., router 104B, by logically grouping a plurality of physical ports 404, e.g., ports 404A-I, into a logical interface 405. That is, the physical connections between router 104A and a particular network device, e.g., router 104B, may be logically grouped into a logical interface 405. Each set of physical connections between router 104A and a particular network device may be logically grouped into a particular logical interface 405. For example, if ports 404A-F were physically connected to network device #1, then ports 404A-F may be logically grouped into logical interface 405 #1. If ports 404G-I were physically connected to network device #2, then ports 404G-I may be logically grouped into logical interface 405 #2. It is noted that physical ports 404 may be logically grouped into more than one logical interface 405 and that FIG. 4 is illustrative. It is further noted that each logical interface 405 may be associated with logically grouping a plurality of physical connections to a particular network device, e.g., router, gateway, edge device, server. It is further noted that a logical interface 405 may be associated with logically grouping a plurality of ports in either one blade 402 or across multiple blades 402.

By logically grouping a plurality of ports 404 coupled to a particular network device into a logical interface 405, network processor 403 may be configured to transmit processed packets to that particular network device via any blade 402/port 404 combination grouped in that logical interface 405. For example, referring to FIG. 4, ports 404A-404I are physically connected to router 104B. If ports 404A-404I were logically grouped into logical interface 405, then a particular network processor 403, e.g., network processor 403A, may be configured to transmit processed packets that are determined to be transmitted to router 104B through any of ports 404A-404I in blades 402A-C, respectively. Network processor 403, e.g., network processor 403A, may be configured to transmit the processed packets to router 104B through ports 404, e.g., ports 404D-I, not in its blade 402, e.g., blade 402A, by forwarding the processed packets to switch fabric 401 which may then direct the processed packets to another appropriate physical blade 402/port 404 combination. Network processor 403, e.g., network processor 403A, may further be configured to transmit the processed packets to router 104B through any ports 404, e.g., ports 404A-C, in its blade 402, e.g., blade 402A, instead of just one physical port 404 in its blade 402, e.g., blade 402A. A more detailed description of routing packets implementing logical interface(s) 405 is provided below in FIG. 5.

Network processor 403, e.g., network processor 403A, may be configured in one embodiment to comprise a memory (not shown), e.g., non-volatile memory, to store a program to perform the steps of a method for routing packets implementing logical interface(s) 405 as described below in conjunction with FIG. 5. The memory (not shown) in network processor 403 may further be configured to store a forwarding table and tables associated with logical interfaces 405 as discussed below in FIG. 5. Network processor 403 may further comprise a processor (not shown), commonly referred to as a packet processor, coupled to the memory (not shown). The packet processor (not shown) may be configured to execute the instructions of the program. It is further noted that the steps of the method performed by the program mentioned above may in an alternative embodiment be implemented in hardware such as in an Application Specific Integrated Circuit (ASIC).

Figure 5:
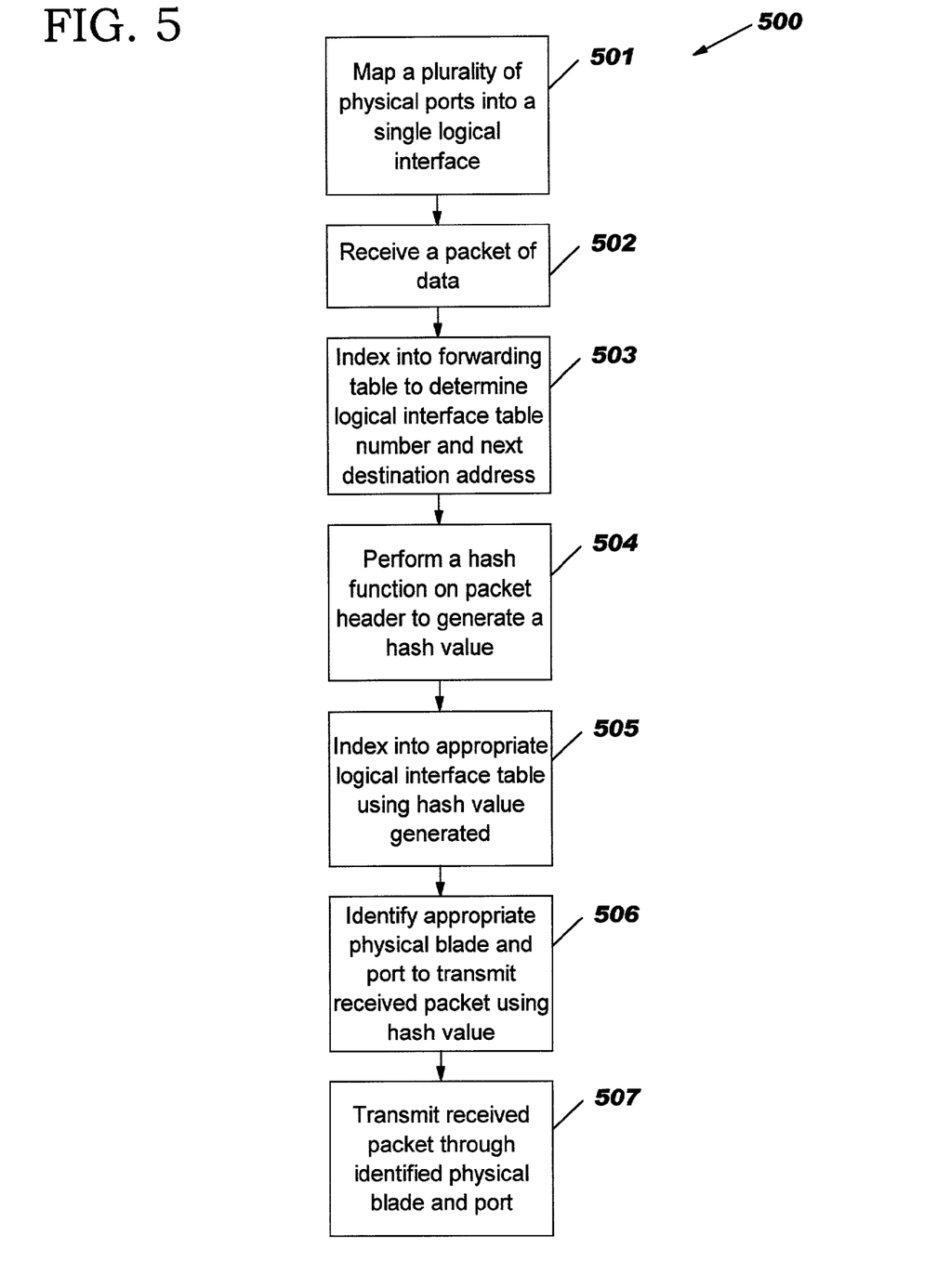
FIG. 5 is a flowchart of a method for routing packets implementing logical interface(s) in accordance with the present invention.

FIG. 5—Method for Routing Packets

FIG. 5 is a flowchart of one embodiment of the present invention of a method 500 for routing packets implementing logical interface(s) 405 (FIG. 4).

Referring to FIG. 5, in conjunction with FIGS. 1 and 4, in step 501, a plurality of physical ports 404 connected to a particular network device, e.g., router 104B, may be mapped into a logical interface 405. For example, referring to FIG. 4, ports 404A-I of router 104A connected to router 104B may be logically grouped into a logical interface 405 thereby enabling network processor 403, e.g., network processor 403A, to transmit packets of data across multiple physical ports 404 to a particular network device, e.g., router 104B, instead of one physical port 404 as discussed further below.

In step 502, network processor 403, e.g., network processor 403A, may receive a packet of data from switch fabric 401. Upon receiving the packet of data, network processor 403, in step 503, may index into a table, commonly referred to as a forwarding table, to determine the table associated with a particular logical interface 405 as well as the next destination address, i.e., the next hop address. The forwarding table may comprise a plurality of entries where each entry may comprise information indicating a particular table associated with a particular logical interface 405 as well as the next destination address. Each logical interface 405 may be associated with a table storing a plurality of entries containing blade 402/port 404 combinations as discussed further below. In one embodiment, an entry may be indexed in the forwarding table using a destination address in the received packet header. It is noted that an entry may be indexed in the forwarding table using other means and that such means would be recognized by an artisan of ordinary skill in the art. It is further noted that embodiments implementing such means would fall within the scope of the present invention.

In step 504, a hash function may be performed on the received packet to generate a hash value. In one embodiment, a hash function may be performed on the source and destination address in the packet header to generate a hash value. It is noted that in other embodiments a hash function may be performed on different fields, e.g., port, type of service, in the received packet to generate a hash value.

In step 505, the hash value generated in step 504 may be used to index into the table associated with a particular logical interface 405 determined in step 503. Upon indexing into the table associated with the logical interface 405 determined in step 503, an appropriate blade 402/port 404 combination may be identified in step 506 to transmit the received packet of data as explained below.

As stated above, the table associated with a particular logical interface 405 may comprise a plurality of entries where each entry may comprise a threshold value associated with a particular blade 402/port 404 combination. The threshold value may represent a percentage of the total number of packets received by router 104A that may be transmitted through the blade 402/port 404 combination associated with that threshold value. In one embodiment, the threshold value may be updated periodically by a user, e.g., system administrator, in control of router 104, e.g., router 104A. For example, the threshold value, e.g., twenty percent of the number of packets received by router 104A, associated with a particular blade 402/port 404 combination may be updated by lowering the threshold value by one percent during each update. An example of an entry of the table associated with a particular logical interface 405 is shown in Table 1 below:

TABLE 1

| Th0 | Th1 | Th2 | Th3 | Th4 | Th5 | Th6 | Th7 | Th8 | Th9 | ThA | ThB | ThC | ThD | ThE | ThF |
|-----|-----|-----|-----|-----|-----|-----|-----|-----|-----|-----|-----|-----|-----|-----|-----|
| B0  | P0  | B1  | P1  | B2  | P2  | B3  | P3  | B4  | P4  | B5  | P5  | B6  | P6  | B7  | P7  |
| B8  | P8  | B9  | P9  | BA  | PA  | BB  | PB  | BC  | PC  | BD  | PD  | BE  | PE  | BF  | PF  |

Table 1 above illustrates an exemplary entry in the table associated with a particular logical interface 405. Each entry may comprise a plurality of threshold values (16 threshold values in exemplary Table 1) where each threshold value is associated with a particular blade 402/port 404 combination. For example, threshold value (Th0) is associated with blade B0/port P0 combination where blade B0 may refer to a particular blade 402, e.g., blade 402B, and port P0 may refer to a particular port 404, e.g., port 404E. Threshold value (Th1) is associated with blade B1/port P1 combination and so forth. As stated above, each threshold value may represent a percentage of the total number of packets received by router 104A that may be transmitted through the blade 402/port 404 combination associated with that threshold value. For example, threshold value (Th0) may represent a percentage of the total number of packets received by router 104A that may be transmitted through port P0 in blade B0. If port P0 refers to port 404D and blade B0 refers to blade 402B, then if Th0 has a value of twenty percent, a maximum of twenty percent of the total packets received by router 104A may be transmitted through port 404D in blade 402B.

As stated above, upon indexing into the table associated with the logical interface 405 determined in step 503, an appropriate blade 402/port 404 combination may be identified in step 506 to transmit the received packet of data. In one embodiment, the hash value generated in step 504 may be used to select a particular threshold value and hence a blade 402/port 404 combination associated with the selected threshold value. In one embodiment, a portion of the bits of the hash value, e.g., most significant bits, may be used to select a particular threshold value in the entry indexed in step 505. For example, referring to Table 1, since there are 16 different threshold values in each entry of the table associated with logical interface 405, only four bits of the hash value generated in step 504 may be used to select a threshold value. Upon selecting a threshold value, the blade 402/port 404 combination associated with the selected threshold value may be used to transmit the received packet.

In step 507, the received packet may be transmitted through the blade 402/port 404 combination identified in step 506 to the destination identified in step 503. For example, referring to FIG. 4, if network processor 403A identified blade 402B/port 404D as being the blade 402/port 404 combination to transmit the processed packet, then network processor 403A may forward the processed packet to switch fabric 401 which may then direct the processed packet to blade 402B/port 404D.

It is noted that method 500 may be executed in a different order presented and that the order presented in the discussion of FIG. 5 is illustrative. It is further noted that certain steps in FIG. 5 may be executed almost concurrently.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for routing packets comprising the steps of:
    mapping a plurality of physical ports into a logical interface to a network device, wherein said plurality of physical ports are connected to one or more processors, wherein said one or more processors are configured to process packets of data;
    receiving a packet of data;
    transmitting said received packet of data to one of said plurality of physical ports of said logical interface; and
    indexing a first table to determine a second table associated with said logical interface.

2. The method as recited in claim 1, wherein said first table is indexed using a destination address of said received packet.

3. The method as recited in claim 1 further comprising the steps of:
    performing a hash function on said received packet to generate a hash value;
    indexing into said second table using said generated hash value; and
    identifying one of said plurality of ports to transmit said received packet from said second table using said generated hash value.

4. The method as recited in claim 3, wherein a blade is identified from said second table using said generated hash value.

5. The method as recited in claim 3, wherein said hash function is performed on a source address and a destination address of said received packet to generate said hash value.

6. A computer program product embodied in a machine readable medium for routing packets comprising the programming steps of:
    mapping a plurality of physical ports into a logical interface to a network device, wherein said plurality of physical ports are connected to one or more processors, wherein said one or more processors are configured to process packets of data
    receiving a packet of data;
    transmitting said received packet of data to one of said plurality of physical ports of said logical interface; and
    indexing a first table to determine a second table associated with said logical interface.

7. The computer program product as recited in claim 6, wherein said first table is indexed using a destination address of said received packet.

8. The computer program product as recited in claim 6 further comprising the programming steps of:
    performing a hash function on said received packet to generate a hash value;
    indexing into said second table using said generated hash value; and
    identifying one of said plurality of ports to transmit said received packet from said second table using said generated hash value.

9. The computer program product as recited in claim 8, wherein a blade is identified from said second table using said generated hash value.

10. The computer program product as recited in claim 8, wherein said hash function is performed on a source address and a destination address of said received packet to generate said hash value.

11. A network processor, comprising:
    a memory unit operable for storing a computer program operable for routing packets; and
    processor coupled to said memory unit, wherein said processor, responsive to said computer program, comprises:
        circuitry operable for mapping a plurality of physical ports into a logical interface to a network device, wherein said plurality of physical ports are connected to one or more network processors, wherein said one or more network processors are configured to process packets of data;
        circuitry operable for receiving a packet of data;
        circuitry operable for transmitting said received packet of data to one of said plurality of physical ports of said logical interface; and
        circuitry operable for indexing a first table to determine a second table associated with said logical interface.

12. The system as recited in claim 11, wherein said first table is indexed using a destination address of said received packet.

13. The system as recited in claim 11, wherein said processor further comprises:
    circuitry operable for performing a hash function on said received packet to generate a hash value;
    circuitry operable for indexing into said second table using said generated hash value; and
    circuitry operable for identifying one of said plurality of ports to transmit said received packet from said second table using said generated hash value.

14. The system as recited in claim 13, wherein a blade is identified from said second table using said generated hash value.

15. The system as recited in claim 13, wherein said hash function is performed on a source address and a destination address of said received packet to generate said hash value.

16. A system, comprising:
    a plurality of blades; and
    a switch fabric coupled to said plurality of blades, wherein said switch fabric is configured to direct incoming packets of data to particular blades;
    wherein each of said plurality of blades comprises:
        a first processor, wherein said first processor is configured to process packets of data; and
        one or more ports coupled to said first processor, wherein said one or more ports are configured to transmit processed packets of data;
    wherein said first processor comprises:
        a memory unit operable for storing a computer program operable for routing packets; and
        a second processor coupled to said memory unit, wherein said second processor, responsive to said computer program, comprises:
            circuitry operable for mapping a plurality of ports of one or more blades into a logical interface to a network device;
            circuitry operable for receiving a packet of data;
            circuitry operable for transmitting said received packet of data to one of said plurality of physical ports of said logical interface; and circuitry operable for indexing a first table to determine a second table associated with said logical interface.

17. The system as recited in claim 16, wherein said first table is indexed using a destination address of said received packet.

18. The system as recited in claim 16, wherein said second processor further comprises:
   circuitry operable for performing a hash function on said received packet to generate a hash value;
   circuitry operable for indexing into said second table using said generated hash value; and
   circuitry operable for identifying one of said plurality of ports to transmit said received packet from said second table using said generated hash value.

19. The system as recited in claim 18, wherein a blade is identified from said second table using said generated hash value.

20. The system as recited in claim 18, wherein said hash function is performed on a source address and a destination address of said received packet to generate said hash value.

* * * * *